(12) United States Patent
Sorin et al.

(10) Patent No.: US 9,160,481 B2
(45) Date of Patent: Oct. 13, 2015

(54) OPTICAL POLARIZATION MULTIPLEXING USING LASER ARRAYS

(75) Inventors: Wayne V. Sorin, Mountain View, CA (US); Michael Renne Ty Tan, Menlo Park, CA (US); Sagi Varghese Mathai, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 178 days.

(21) Appl. No.: 13/877,638

(22) PCT Filed: Oct. 8, 2010

(86) PCT No.: PCT/US2010/052007
§ 371 (c)(1),
(2), (4) Date: Apr. 3, 2013

(87) PCT Pub. No.: WO2012/047230
PCT Pub. Date: Apr. 12, 2012

(65) Prior Publication Data
US 2013/0183036 A1    Jul. 18, 2013

(51) Int. Cl.
*H04J 14/06* (2006.01)
*H04J 14/02* (2006.01)
*H04B 10/532* (2013.01)

(52) U.S. Cl.
CPC ............. *H04J 14/06* (2013.01); *H04B 10/532* (2013.01); *H04J 14/02* (2013.01)

(58) Field of Classification Search
USPC .................. 398/46, 65, 74, 79, 152, 184, 205
See application file for complete search history.

(56) References Cited

U.S. PATENT DOCUMENTS

| | | | |
|---|---|---|---|
| 6,002,705 A | 12/1999 | Thornton | |
| 6,154,479 A | 11/2000 | Yoshikawa et al. | |
| 6,571,032 B1 | 5/2003 | Pilipetskii et al. | |
| 6,693,934 B2 | 2/2004 | Wang | |
| 6,836,501 B2 | 12/2004 | Cox et al. | |
| 6,973,224 B1 * | 12/2005 | Deng et al. ........................ | 385/11 |
| 7,693,424 B1 | 4/2010 | Krishnamoorthy et al. | |

(Continued)

FOREIGN PATENT DOCUMENTS

CN    101667880    3/2010
DE    3716247    11/1988

(Continued)

OTHER PUBLICATIONS

Goodwill, D.J. "Optical Interconnect Module Extensible to 10,000 Parallel Channels for a Smart-Pixel Optical Backplane", http://ieeexplore.ieee.org/xpl/freeabs_all.jsp?arnumber=540745 IEEE Xplore Digital Library, Aug. 6, 2002, p. 1.

(Continued)

*Primary Examiner* — David Payne
*Assistant Examiner* — Casey Kretzer
(74) *Attorney, Agent, or Firm* — Tarolli Sundheim Covell & Tummino LLP

(57) ABSTRACT

An optical data system and method are disclosed. An optical data system includes an array of lasers that are modulated by the plurality of modulation signals to provide a plurality of pairs of orthogonally polarized optical data signals. The optical data system further includes an optical multiplexing system to combine each of the pairs of orthogonally polarized optical data signals to provide a plurality of dual-channel optical data signals.

16 Claims, 4 Drawing Sheets

(56) References Cited

U.S. PATENT DOCUMENTS

| | | |
|---|---|---|
| 2001/0014193 A1 | 8/2001 | Shibuya |
| 2003/0128982 A1 | 7/2003 | Glingener |
| 2003/0137927 A1 | 7/2003 | Sato |
| 2004/0252744 A1* | 12/2004 | Anikitchev et al. ............ 372/100 |
| 2005/0036533 A1 | 2/2005 | Cox et al. |
| 2006/0109159 A1* | 5/2006 | Holly ................................ 342/13 |
| 2009/0097851 A1* | 4/2009 | Tan et al. ......................... 398/82 |
| 2009/0103921 A1 | 4/2009 | Frankel |
| 2009/0297165 A1* | 12/2009 | Nakamoto ..................... 398/155 |
| 2010/0158522 A1* | 6/2010 | Cho et al. ........................ 398/65 |

FOREIGN PATENT DOCUMENTS

| | | |
|---|---|---|
| EP | 0782328 | 7/1997 |
| WO | WO-03088439 | 10/2003 |
| WO | WO-2010006081 | 1/2010 |

OTHER PUBLICATIONS

International Search Report and Written Opinion, Jul. 28, 2011, PCT Application No. PCT/US2010/052007.

Li, Jianqiang et al., "Experimental Demonstration of Polarization Multiplexing for Simultaneously Providing Broadband Wireless and Wired Access", Optics Communications, vol. 281, Issue 10, May 15, 2008, pp. 2806-2810.

Onishi, T. et al., "Polarization Control of VCSEL Array by Metal Nanoholes at Rectangular Lattice Utilizing Surface Plasmon Resonance", Semiconductor Laser Conference, Oct. 2006, Conference Digest, 2006 IEEE 20th International, pp. 103-104.

Onishi, T., et al. "Polarization Control of VCSEL Array Utilizing Surface Plasmon Resonance." IEIC Technical Report (Institute of Electronics, Information and Communication Engineers) 106.404 (2006): 17-20.

Rochat, Etienne et al., "Investigation of Combined Wavelength and Polarisation Division Multiplexing in C-Band over 50m Multimode Fibre Links up to 3km", IEEE Jun. 2003, p. 533.

Van Den Borne, D. et al., "PMD-Induced Transmission Penalties in Polarization-Multiplexed Transmission", Journal of Lightwave Technology, vol. 23 Issue 12, Dec. 2005, pp. 4004-4015.

Zhou, Yuxin et al., "High-Speed Wavelength-Division Multiplexing and Demultiplexing Using Monolithic Quasi-Planar VCSEL and Resonant Photodetector Arrays with Strained InGaAs Quantum Wells", IEEE, © 2000, pp. 1-3.

* cited by examiner

OPTICAL POLARIZATION MULTIPLEXING USING LASER ARRAYS

BACKGROUND

Optical data rate connectivity, such as in computer systems, is constantly increasing to meet consumer demands for increased bandwidth. As an example, optical data rate connectivity may be required in the future to achieve bandwidths in the Terahertz range.

DETAILED DESCRIPTION

Figure 1:
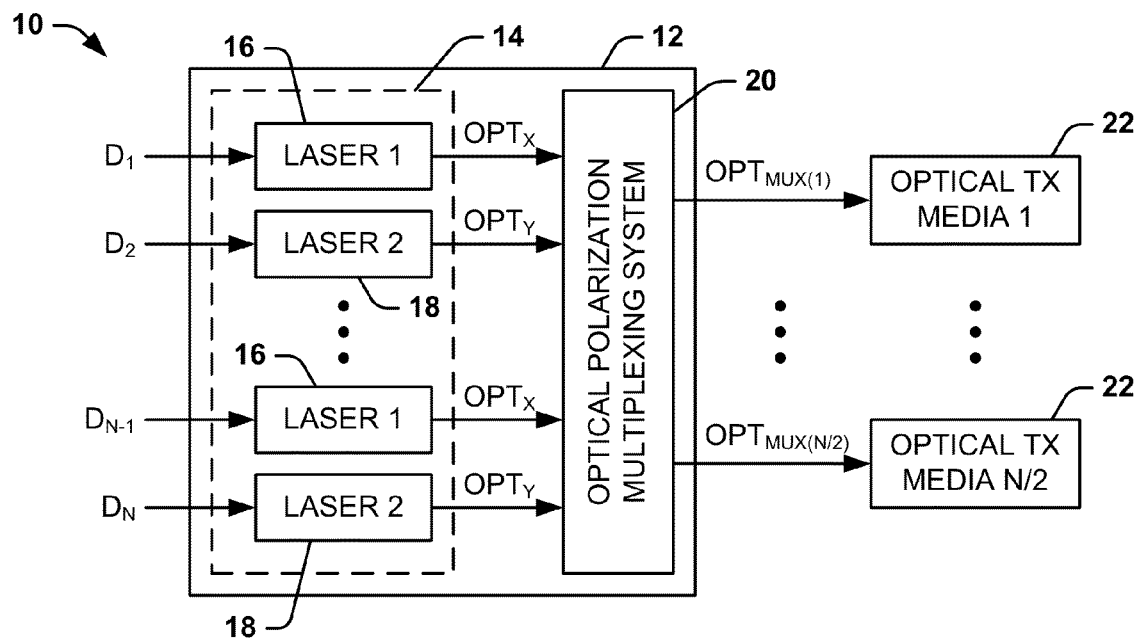
FIG. 1 illustrates an example of an optical data system.

FIG. 1 illustrates an example of an optical data system 10. The optical data system 10 can be incorporated in any of a variety of computer systems to transfer data, such as across a backplane of a computer system. As one example, the optical data system can be implemented as an optical transmission system for sending data as optical signals across an optical backplane (e.g., a waveguide) of a computer system. The optical data system 10 includes an integrated package 12, such as can be configured as a chip and mounted on a computer motherboard.

The integrated package 12 includes a laser array 14. In the example of FIG. 1, the laser array 14 includes a plurality of pairs of lasers. The array of lasers 16, with each pair of lasers including a first laser 16 and a second laser 18, for a total of N lasers in the laser array 14. A set of data modulation signals $D_1$ through $D_N$, are provided to modulate lasers in the array 14 within the integrated package 12, where N is a positive even integer greater than two. As an example, the data modulation signals $D_1$ through $D_N$ can each be individual radio frequency (RF) data signals for transmission of separate data channels. The array of lasers provide optical signals based on the data modulation signals $D_1$ through $D_N$. An optical multiplexing system 20 is configured to implement polarization multiplexing of each respective pair of orthogonally polarized optical data signals $OPT_X$ and $OPT_Y$. That is, the optical multiplexing system 20 combines each of the pairs of optical signals $OPT_X$ and $OPT_Y$ to generate a dual-channel optical data signal $OPT_{MUX}$.

The orthogonally polarized optical data signals $OPT_X$ and $OPT_Y$ can be generated in a variety of ways. In the example of FIG. 1, the array of lasers 14 includes respective pairs of lasers 16 and 18 that emit the orthogonally polarized optical signals $OPT_X$ and $OPT_Y$. Each of the first lasers 16 in the array 14 are demonstrated as providing an optical data signal $OPT_X$ in response to a respective one of a set of data modulation signals $D_1$ through $D_N$. The optical data signals $OPT_X$ have a first polarization state. Similarly, each of the second lasers 18 emit an optical data signal $OPT_Y$ in response to one of the data modulation signals $D_1$ through $D_N$, which have a second polarization state that is orthogonal to the first polarization state.

As another example, the first and second lasers 16 and 18 can be configured to generate the optical data signals as having the same polarization states. An interposed half-wave plate can be configured to rotate the polarization of the optical data signals from one of the first and second lasers 16 and 18 by 90°. In addition, because the data modulation signals $D_1$ through $D_N$ can be provided as distinct channel signals, the optical signals $OPT_X$ and $OPT_Y$ can all likewise represent distinct data channels with respect to each other.

The laser array 14 can be any of a variety of differently sized single arrays or it can be implemented using multiple arrays of lasers. For instance, the laser array 14 can be configured as a single two-dimensional array of lasers or multiple one-dimensional arrays of lasers that are arranged in the same plane or at different planes in three-dimensional space, such as orthogonally with respect to each other.

Each of the lasers 16 and 18 can be configured as a variety of different kinds of lasers. As an example, the lasers 16 and 18 can be configured as surface emitting lasers, such as vertical cavity surface emitting lasers (VCSELs), such that the laser array is implemented as an array of VCSELs. Alternatively, the lasers 16 and 18 can be implemented as distributed feedback (DFB) lasers, such as surface emitting DFB lasers. Furthermore, the one or more arrays of the lasers 16 and 18 that constitute the laser array 14 can be arranged on the same substrate, or each array itself is arranged on the same substrate which is separate from the substrate for one or more other arrays. This arrangement of lasers 16 and 18 in the array 14 can implement low-cost lasers that occupy a small physical space, such as can be manufactured for use in a confined space in an associated computer system.

The optical multiplexing system 20 provides the dual-channel optical data signals $OPT_{MUX}$ to respective optical transmission media 22. The transmission media can be configured as a waveguide, an optical fiber or as a hollow-metal waveguide or as a solid planar waveguide. The dual-channel optical data signals $OPT_{MUX}$, and thus the optical transmission media 22 are demonstrated in the example of FIG. 1 as numbering 1 through N/2, and thus numbering half of the data modulation signals $D_1$ through $D_N$. The polarization multiplexing of the optical data signals $OPT_X$ and $OPT_Y$ to generate the dual-channel optical data signals $OPT_{MUX}$ can thus result in a significant cost and space reduction, as opposed to separate optical transmission of each of the optical signals $OPT_X$ and $OPT_Y$ individually.

The optical multiplexing system 20 can be configured in a variety of ways. For example, the optical multiplexing system 20 can include a set of optical components that are configured to combine each pair of the optical data signals $OPT_X$ and $OPT_Y$, such that they propagate substantially collinearly as the dual-channel optical data signals $OPT_{MUX}$. As one example, the optical multiplexing system 20 can include one or more polarization beam combiner that is configured to pass one of the optical signals $OPT_X$ and $OPT_Y$ and reflect the other of the optical signals $OPT_X$ and $OPT_Y$. As another example, the optical polarization multiplexing system 10 can include a birefringent crystal that is configured to combine the optical data signals $OPT_X$ and $OPT_Y$ based on causing a predetermined walk-off of one of the optical data signals $OPT_X$ and $OPT_Y$ through the birefringent crystal. Thus, as described herein, the optical polarization multiplexing system 10 can be configured in a variety of ways.

In the example of FIG. 1, the optical polarization multiplexing system 20 can receive the optical signal directly from one or more arrays of lasers 14, such that no intervening optical waveguides (e.g., fiber) and associated optical couplers are required. Such an approach allows the components of the system to be fabricated in the integrated package 12 with a common substrate (e.g., silicon) and dimensioned to be about equal to or less than one $cm^3$.

Figure 2:
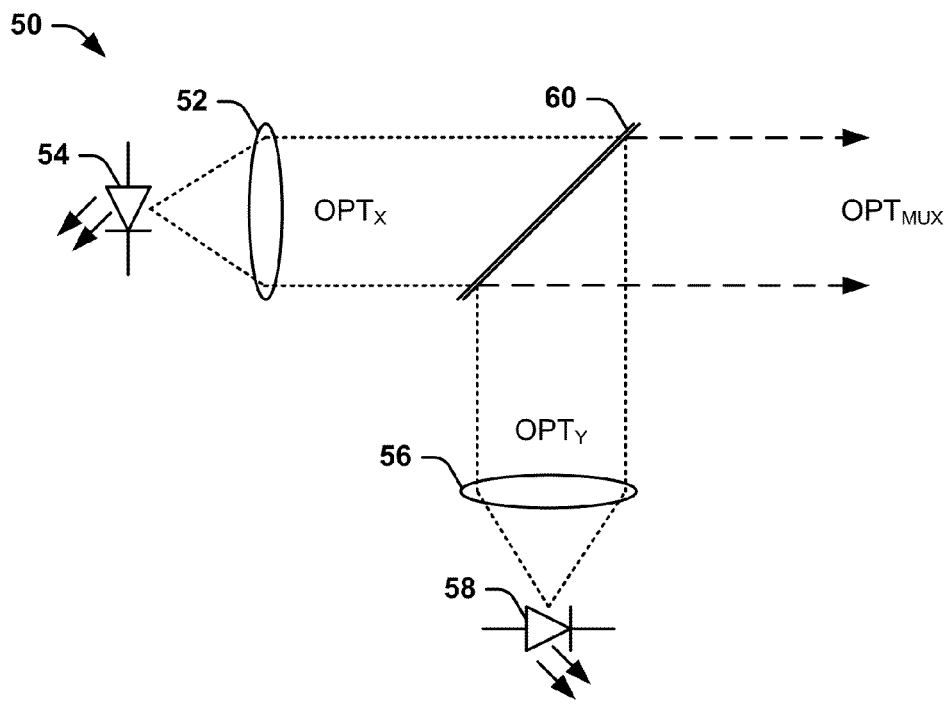
FIG. 2 illustrates an example of an optical polarization multiplexing system.

FIG. 2 illustrates an example of an optical polarization multiplexing system 50. The optical polarization multiplexing system 50 can be configured as the optical polarization multiplexing system 20 in the example of FIG. 1. Therefore, reference can be made to the example of FIG. 1 in the following description of the example of FIG. 2.

The optical polarization multiplexing system 50 includes a first lens 52 configured to substantially collimate a first optical data signal $OPT_X$ that is generated by a first laser 54. Similarly, the optical polarization multiplexing system 50 includes a second lens 56 configured to substantially collimate the second optical data signal $OPT_Y$ that is generated by a second laser 58. As an example, the first and second lasers 54 and 58 can correspond to one of each of the first and second lasers 16 and 18, respectively, in the example of FIG. 1, such that the optical signals have orthogonal polarization. For example, the first and second lasers 54 and 58 can be configured as surface emitting lasers, such as VCSELs, which can be one of a plurality of lasers in separate respective one-dimensional arrays of lasers (e.g., extending in a direction through the page). In the example of FIG. 2, the first and second lasers 54 and 58 are arranged at an orthogonal angle with respect to each other.

The optical polarization multiplexing system 50 includes a polarizing beam combiner 60. In the example of FIG. 2, the polarizing beam combiner 60 comprises a substantially planar filter arranged at an approximate 45° angle in the optical path of both of the optical signals $OPT_X$ and $OPT_Y$. As demonstrated in the example of FIG. 2, the polarizing beam combiner 60 is configured to pass the optical data signal $OPT_X$ therethrough and to reflect the optical data signal $OPT_Y$. Therefore, the polarizing beam combiner 60 allows the optical data signals $OPT_X$ and $OPT_Y$ to propagate substantially collinearly. Accordingly, the optical data signals $OPT_X$ and $OPT_Y$ are polarization multiplexed to generate the corresponding dual-channel optical signal $OPT_{MUX}$. The dual-channel optical signal $OPT_{MUX}$ can then be launched into an optical transmission media (e.g., one of the media 22 of FIG. 1), such as an optical fiber, hollow-metal waveguide, or solid planar waveguide.

In the example where each of the lasers 54 and 56 is implemented as an array of lasers (e.g., a VCSEL array), the polarizing beam combiner 60 can be implemented as an elongated single planar filter that extends commensurate with the length of the laser arrays for combining respective pairs of the orthogonally polarized optical data signals.

Figure 3:
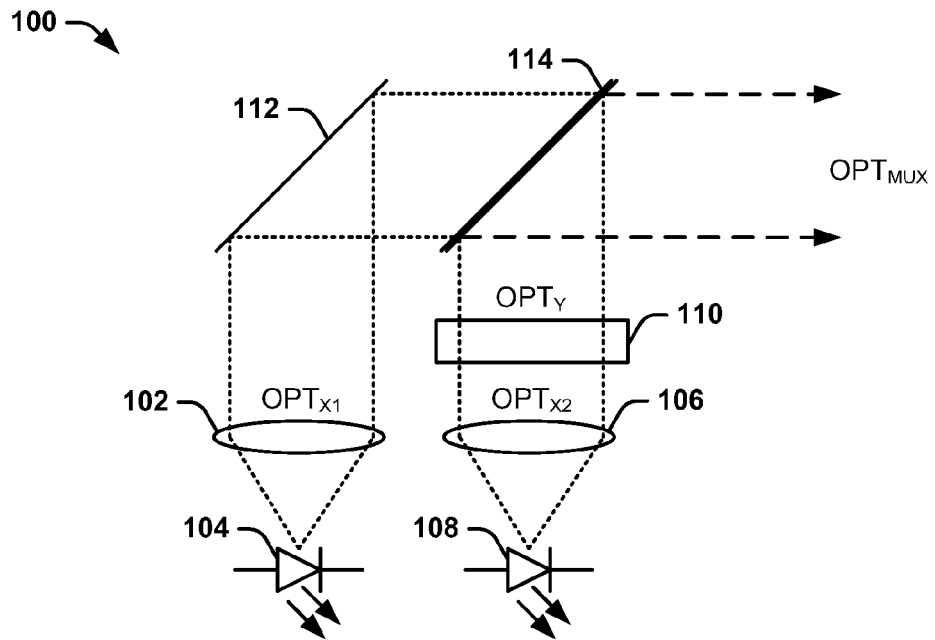
FIG. 3 illustrates another example of an optical polarization multiplexing system.

FIG. 3 illustrates another example of an optical polarization multiplexing system 100. The optical polarization multiplexing system 100 can be configured as the optical polarization multiplexing system 10 in the example of FIG. 1. Therefore, reference can be made to the example of FIG. 1 in the following description of the example of FIG. 3.

The optical polarization multiplexing system 100 includes a first lens 102 configured to substantially collimate a first optical data signal $OPT_{X1}$ that is generated by a first laser 104. Similarly, the optical polarization multiplexing system 100 includes a second lens 106 configured to substantially collimate a second optical data signal $OPT_{X2}$ that is generated by a second laser 108. As one example, the first and second lasers 104 and 108 can each be configured to generate separately modulated optical data signals $OPT_{X1}$ and $OPT_{X2}$ that have the same polarization. In the example of FIG. 2, the first and second lasers 104 and 108 are arranged substantially parallel with respect to each other. For instance, the first and second lasers 104 and 108 can be configured as surface emitting lasers, such as VCSELs, that are each one of a plurality of lasers in a two-dimensional array of lasers (e.g., a 2×12 array of lasers in the direction of the page), which can reside on the same substrate.

In the example of FIG. 3, the optical polarization multiplexing system 100 includes a polarization rotating structure (e.g., a half-wave plate) 110 in the optical path of the second optical data signal $OPT_{X2}$. The polarization rotating structure 110 can be configured to rotate the polarization of the second optical data signal $OPT_{X2}$ emitted from the second laser 108 to generate an optical data signal $OPT_Y$ having an orthogonal polarization relative to the first optical signal $OPT_{X1}$ emitted from the first laser 104. Alternatively, the polarization rotating structure 110 may be omitted from the optical polarization multiplexing system 100, such that the second laser 108 generates the optical signal $OPT_Y$ directly, similar to the second laser 58 in the example of FIG. 2.

The optical polarization multiplexing system 100 includes a mirror 112 and a polarizing beam combiner 114, such as a filter. In the example of FIG. 3, the mirror 112 is arranged at an approximate 45° angle in the optical path of the first optical data signal $OPT_{X1}$ to reflect the first optical data signal $OPT_{X1}$ in an orthogonal direction. Similarly, polarizing beam combiner 114 is arranged at an approximate 45° angle in the optical path of the optical data signal $OPT_Y$. Thus, in the example of FIG. 3, the polarizing beam combiner 114 is configured to pass the first optical data signal $OPT_{X2}$ therethrough, after being reflected from the mirror 112, and to reflect the second optical data signal $OPT_Y$. Therefore, the polarizing beam combiner 114 combines the optical data signals $OPT_X$ and $OPT_Y$ to propagate substantially collinearly. That is, the optical data signals $OPT_X$ and $OPT_Y$ are polarization multiplexed to generate the dual-channel optical signal $OPT_{MUX}$. The dual-channel optical signal $OPT_{MUX}$ can then be launched into one of the optical transmission media 22, such as an optical fiber, hollow-metal waveguide, or any other waveguide structure.

Figure 4:
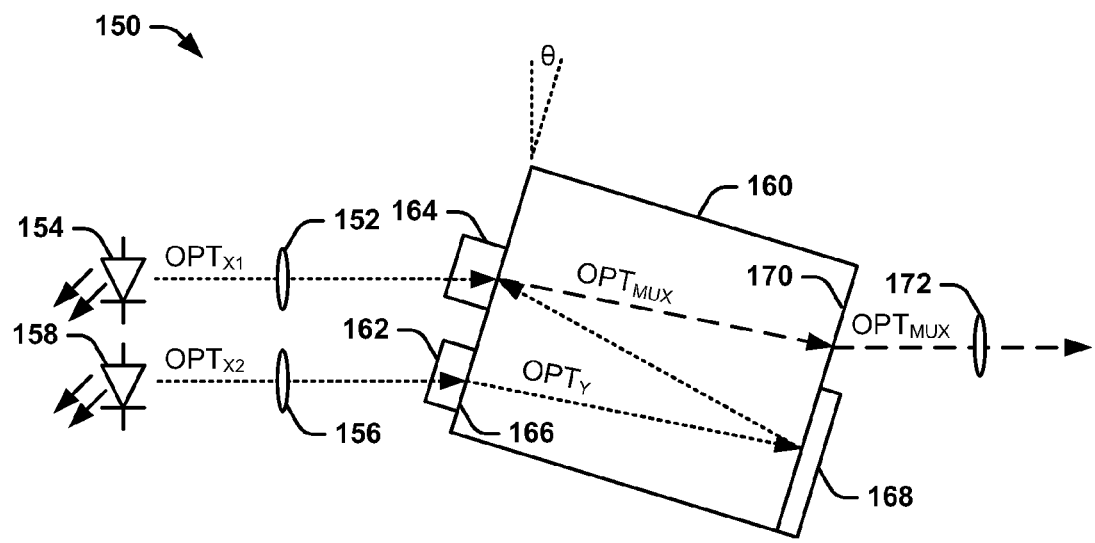
FIG. 4 illustrates yet another example of an optical polarization multiplexing system.

FIG. 4 illustrates yet another example of an optical polarization multiplexing system 150. The optical polarization multiplexing system 150 can be configured as the optical polarization multiplexing system 10 in the example of FIG. 1. Therefore, reference is to be made to the example of FIG. 1 in the following description of the example of FIG. 4.

The optical polarization multiplexing system 150 includes a first lens 152 configured to substantially collimate a first optical data signal $OPT_{X1}$ that is generated by a first laser 154. Similarly, the optical polarization multiplexing system 150 includes a second lens 156 configured to substantially collimate a second optical data signal $OPT_{X2}$ that is generated by a second laser 158. As an example, the first and second lasers 154 and 158 can each be configured to generate separately modulated optical data signals $OPT_{X1}$ and $OPT_{X2}$ that have the same polarization. In the example of FIG. 4, the first and second lasers 154 and 158 are arranged substantially parallel with respect to each other. For example, the first and second lasers 154 and 158 can be configured as surface emitting lasers, such as VCSELs, that are each one of a plurality of lasers in a two-dimensional array of lasers (e.g., a 2×12 array of lasers in the direction of the page), and can be arranged on the same substrate.

In the example of FIG. 4, the optical polarization multiplexing system 150 includes a solid optical medium 160 that is oriented at an angle θ with respect to the lasers 154 and 158.

The solid optical medium 160 can be implemented as any solid material having an optical transmissivity that is less than about 1 dB of propagation loss. Examples of solid optical medium include glass and plastic materials.

In the example of FIG. 4, a polarization rotating structure 162 and a polarizing beam combiner 164 are each coupled to a first surface 166 of the optical medium 160. For instance, the polarization rotating structure 162 can be implemented as a half-wave plate is arranged in the optical path of the second optical data signal $OPT_{X2}$ and is configured to rotate the polarization of the second optical data signal $OPT_{X2}$ emitted from the second laser 158. The polarization rotating structure 162 thus provides an optical data signal $OPT_Y$ having an orthogonal polarization relative to the first optical data signal $OPT_{X1}$ emitted from the first laser 154. Alternatively, the polarization rotating structure 162 may be omitted from the optical polarization multiplexing system 150, and the second laser 158 can be configured with the orthogonally polarized optical signal $OPT_Y$ directly, similar to the second laser 58 in the example of FIG. 2.

The polarizing beam combiner 164 is arranged in the optical path of the first optical signal $OPT_{X1}$ and is configured to pass the first optical signal $OPT_{X1}$ therethrough. Upon passing through the respective polarizing beam combiner 164 and polarization rotating structure 162, the optical data signals $OPT_X$ and $OPT_Y$ are each refracted at the first surface 166 of the solid optical medium 160. The optical data signal $OPT_Y$, upon propagating through the solid optical medium 160, is reflected from a mirror 168 that is coupled to a second surface 170 of the optical medium 160. The angle 8 can be configured such that the optical data signal $OPT_Y$ is reflected from the mirror 168 to the polarizing beam combiner 164, which can be configured to likewise reflect the optical data signal $OPT_Y$. That is, the polarizing beam combiner 164 can be configured to pass the first optical signal $OPT_{X1}$ through but to reflect the orthogonally polarized second optical signal $OPT_Y$, such as can be based on polarization and/or wavelength. In this way, the optical data signals $OPT_X$ and $OPT_Y$ propagate substantially collinearly through the solid optical medium 160 such that they are polarization multiplexed to provide the dual-channel optical signal $OPT_{MUX}$. The dual-channel optical signal $OPT_{MUX}$ propagates from the polarizing beam combiner 164 to a second surface of the solid optical medium 160. The dual-channel optical signal $OPT_{MUX}$ can refract upon exiting the second surface 170 of the solid optical medium 160. The dual-channel optical signal $OPT_{MUX}$ can then be launched into an optical transmission media (e.g., one of the media 22), such as an optical fiber or hollow-metal waveguide, via a lens 172.

Figure 5:
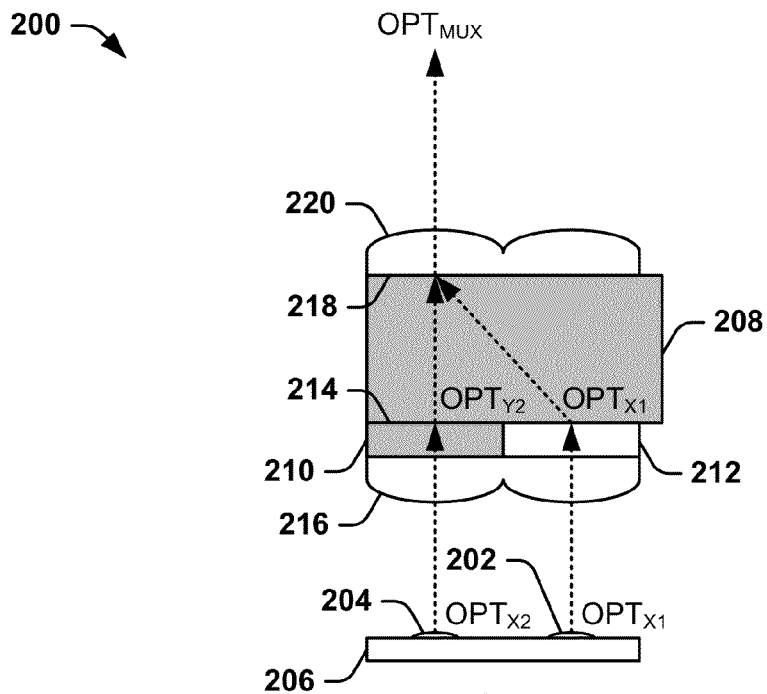
FIG. 5 illustrates yet a further example of an optical polarization multiplexing system.

FIG. 5 illustrates yet another example of an optical polarization multiplexing system 200. The optical polarization multiplexing system 200 can be configured as the optical polarization multiplexing system 10 in the example of FIG. 1. Therefore, reference can be made to the example of FIG. 1 in the following description of the example of FIG. 5 for additional context.

The optical polarization multiplexing system 200 includes a first laser 202 configured to generate a first optical data signal $OPT_{X1}$ and a second laser 204 configured to generate a second optical data signal $OPT_{X2}$. As an example, the first and second lasers 202 and 204 can each be configured to generate separately modulated optical data signals $OPT_{X1}$ and $OPT_{X2}$ that have the same polarization state. In the example of FIG. 5, the first and second lasers 202 and 204 are arranged substantially parallel with respect to each other as part of a two-dimensional array on the same substrate 206. For example, the first and second lasers 202 and 204 can be configured as surface emitting lasers, such as VCSELs.

In the example of FIG. 5, the optical polarization multiplexing system 200 includes a birefringent (i.e., walk-off) crystal 208 that is configured to combine the optical data signals $OPT_{X1}$ and $OPT_{X2}$ based on a spatial walk-off of one of the optical data signals through the birefringent crystal where the walk-off depends on the polarization states of the respective signal. For instance, the polarization state for each of the optical data signals from the lasers 202 and 204 can be controlled by employing polarization control of laser arrays or by employing a polarization rotating structure (e.g., a half-wave plate) to orthogonally rotate the polarization state of one of each pair of optical data signals.

In the example of FIG. 5, the birefringent crystal 208 includes a polarization rotating structure (e.g., a half-wave plate) 210 and a spacer 212 that are each coupled to a first surface 214 of the birefringent crystal 208. For instance, the spacer can be a glass spacer or be formed of another solid optical medium. The polarization rotating structure 210 is arranged in the optical path of the second optical data signal $OPT_{X2}$ and the spacer 212 is arranged in the optical path of the first optical data signal $OPT_{X1}$. The first and second optical data signals $OPT_{X1}$ and $OPT_{X2}$ are emitted from the first and second lasers 202 and 204, respectively, and provided directly (e.g., without intervening waveguide or couplers) to a lens array 216 that is coupled to polarization rotating structure 210 and the spacer 212. The lens array is configured to collimate the first and second optical data signals $OPT_{X1}$ and $OPT_{X2}$ onto the respective spacer 212 and polarization rotating structure. The spacer 212 has substantially no effect on the first optical data signal $OPT_{X1}$, but instead passes the signal unimpeded to the birefringent crystal 208. The polarization rotating structure 210 rotates the polarization of the second optical data signal $OPT_{X2}$ to generate an optical data signal $OPT_Y$ having an orthogonal polarization state relative to the first optical signal $OPT_{X1}$. Alternatively, the polarization rotating structure 210 may be omitted from the optical polarization multiplexing system 200, and the second laser 204 can be configured to generate the optical signal $OPT_Y$ directly, similar to the second laser 58 in the example of FIG. 2.

The birefringent crystal 208 can be configured to spatially walk-off the first optical data signal $OPT_{X1}$ and to pass the optical data signal $OPT_Y$ with substantially no effect based on the respective polarizations of the optical data signals $OPT_{X1}$ and $OPT_Y$. In the example of FIG. 5, upon passing through the polarization rotating structure 210, the optical data signal $OPT_Y$ passes through the birefringent crystal 208 with substantially no effect, such that the optical data signal $OPT_Y$ propagates straight through the birefringent crystal 208. However, upon passing through the spacer 212, the first optical data signal $OPT_{X1}$ spatially walks-off through the birefringent crystal 208. The thickness of the birefringent crystal 208 can be selected based on the angle of spatial walk-off of the first optical data signal $OPT_{X1}$ such that the spatial walk-off of the first optical data signal $OPT_{X1}$ can occur at approximately the same location as the propagation of the optical data signal $OPT_Y$ through the second surface 218. Thus, the optical data signals $OPT_{X1}$ and $OPT_Y$ propagate substantially collinearly from the second surface 218 of the birefringent crystal 208. Accordingly, the optical data signals $OPT_{X1}$ and $OPT_Y$ are polarization multiplexed to generate the dual-channel optical signal $OPT_{MUX}$. The dual-channel optical signal $OPT_{MUX}$ can then be launched into one of the optical transmission media 22, such as an optical fiber or hollow-metal waveguide, via another lens array 220 coupled to the second surface 218 of the birefingent crystal 208.

As a further example, the birefringent crystal 208 can be configured as an anisotropic optical medium configured to cause optical signals having an extraordinary polarization state (e.g., in the x-direction) to spatially walk-off at a predetermined angle from the incident angle. In contrast, the other optical signal (e.g., having an ordinary polarization in the y-direction) does not experience walk-off. Thus, in the example of FIG. 5, the optical data signal $OPT_{X1}$ experience walk-off at a predetermined angle from the first surface 214 to the second surface 218. In contrast, the optical data signal $OPT_{Y2}$ passes through with substantially no walk-off.

For example, upon passing through the polarization rotating structure 210, the optical data signal $OPT_{Y2}$ passes through the birefringent crystal 208 with substantially no spatial walk-off effect, such that the optical data signal $OPT_{Y2}$ can propagate straight through the birefringent crystal 208. However, upon passing through the spacer 212, the orthogonally polarized optical data signal $OPT_{X1}$ walks-off at both the first surface 214 and the second surface 218 of the birefringent crystal 208, such that the orthogonally polarized optical signals are multiplexed together.

The thickness of the birefringent crystal 208 can be selected based on the walk-off of the optical data signal $OPT_{X1}$. In this way, the pair of optical data signals $OPT_{X1}$ and $OPT_{Y2}$ propagate substantially collinearly from the second surface 218 of the birefringent crystal 208 as $OPT_{MUX}$. Accordingly, upon exiting a lens array 220 coupled to the second surface 218 of the birefringent crystal 208, the pair of optical data signals $OPT_{X1}$ and $OPT_{Y2}$ are polarization multiplexed to generate dual-channel optical signal $OPT_{MUX}$. The respective signals $OPT_{X1}$ and $OPT_{Y2}$ may have the same wavelength or they may have different wavelengths.

By way of further example, each of the optical polarization multiplexing systems 50, 100, 150, and 200 can be implemented in the integrated package 12. In such a construction, optical components of each optical polarization multiplexing system 50, 100, 150, and 200 can be configured as a single device. Additionally, in the context of the example of FIG. 1, each of the lasers 16 and lasers 18 can be implemented in one or more arrays of lasers 14, which may also be within the integrated package 12. For instance, the polarizing beam combiners 60, 114, and 164, the solid optical medium 160, the polarization rotating structures 110, 162, and 210, and the birefringent crystal 208 can each be respectively fabricated as a single optical device having dimensions to implement the polarization multiplexing for all of the respective lasers 16 and 18 in the laser array 14. As a result, the integrated package 12 of the optical data system 10 can be fabricated at a lower cost relative to other approaches.

It will be appreciated that the examples of FIGS. 1 through 5 are shown for source sides configured for transmitting optical data signals. It will be understood that corresponding receivers can be implemented with substantially similars construction. The corresponding transmitters and receivers can be optically coupled through one or more optical transmission media (e.g., waveguides, such as optical fibers), such as to form an optical communication system. This further allows cost savings since higher volumes of transmitter and receiver devices can be fabricated from a common design.

Figure 6:
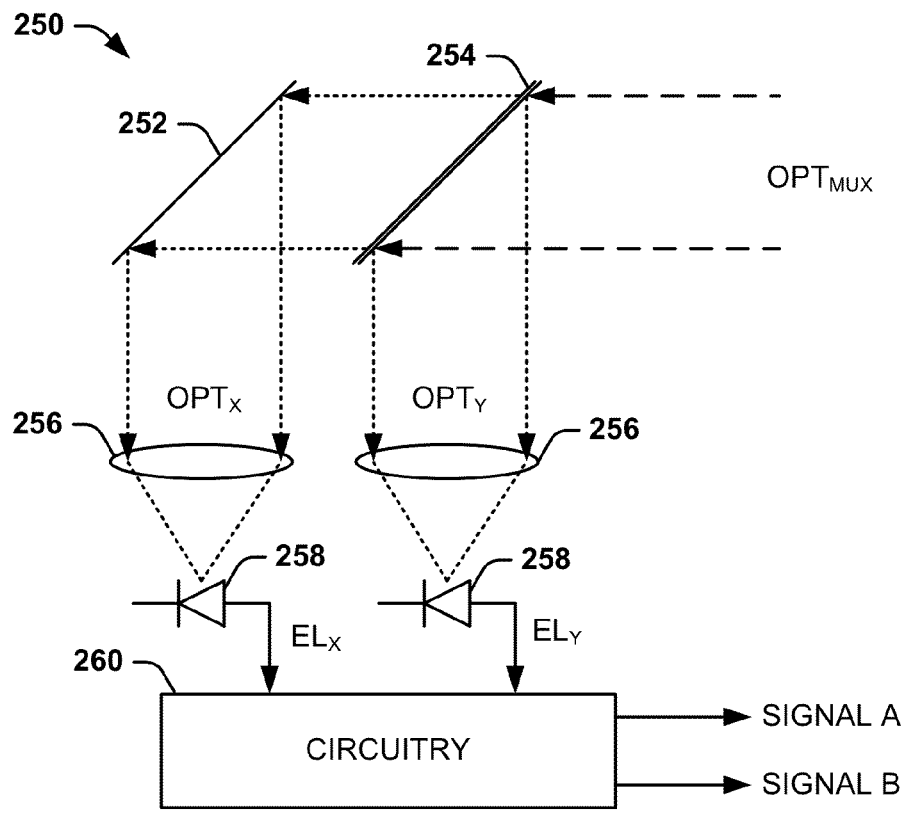
FIG. 6 illustrates an example of an optical polarization demultiplexing system.

As one example, FIG. 6 illustrates an optical polarization demultiplexing system 250, which is similar in construction to the optical polarization multiplexing system 50 of FIG. 3. The optical polarization demultiplexing system 250 can be implemented at a destination device or processor, such as on a backplane of an associated computer system. As an example, the optical polarization demultiplexing system 250 can be located at an optical receiver, such as on a distal end of the optical transmission media 22 in the example of FIG. 1.

The optical polarization multiplexing system 250 includes a mirror 252 and a polarizing beam splitter 254. In the example of FIG. 6, the polarizing beam splitter 254 is arranged at an approximate 45° angle in the optical path of the dual-channel optical signal $OPT_{MUX}$. Thus, the polarizing beam splitter 254 is configured to separate the dual-channel optical signal $OPT_{MUX}$ into the orthogonally polarized optical data signals $OPT_X$ and $OPT_Y$. For instance, the polarization beam splitter 254 is configured to pass the optical data signal $OPT_X$ therethrough and to reflect the optical data signal $OPT_Y$ in an orthogonal direction. Therefore, the polarizing beam splitter 254 demultiplexes the dual-channel optical signal $OPT_{MUX}$ into component optical data signals $OPT_X$ and $OPT_Y$. The mirror 252 is likewise arranged at an approximate 45° angle in the optical path of the optical data signal $OPT_X$. Thus, after passing through the polarizing beam splitter 254, the mirror 252 reflects the optical data signal $OPT_X$ orthogonally.

A set of lenses 256 focuses each of the optical data signals $OPT_X$ and $OPT_Y$ for receipt by a respective pair of photodiodes 258. The photodiodes 258 are thus configured to convert the optical data signals $OPT_X$ and $OPT_Y$ into respective electrical data signals $EL_X$ and $EL_Y$. The photodiodes 258 can provide electrical data signals $EL_X$ and $EL_Y$ to circuitry (e.g., including a signal processor) 260 that is configured to process the electrical data signals $EL_X$ and $EL_Y$. For instance, the circuitry can include circuitry configured to remove any polarization crosstalk between the electrical data signals $EL_X$ and $EL_Y$. The circuitry 260 outputs the electrical data signals $EL_X$ and $EL_Y$ as separate processed electrical data signals SIGNAL A and SIGNAL B.

Figure 7:
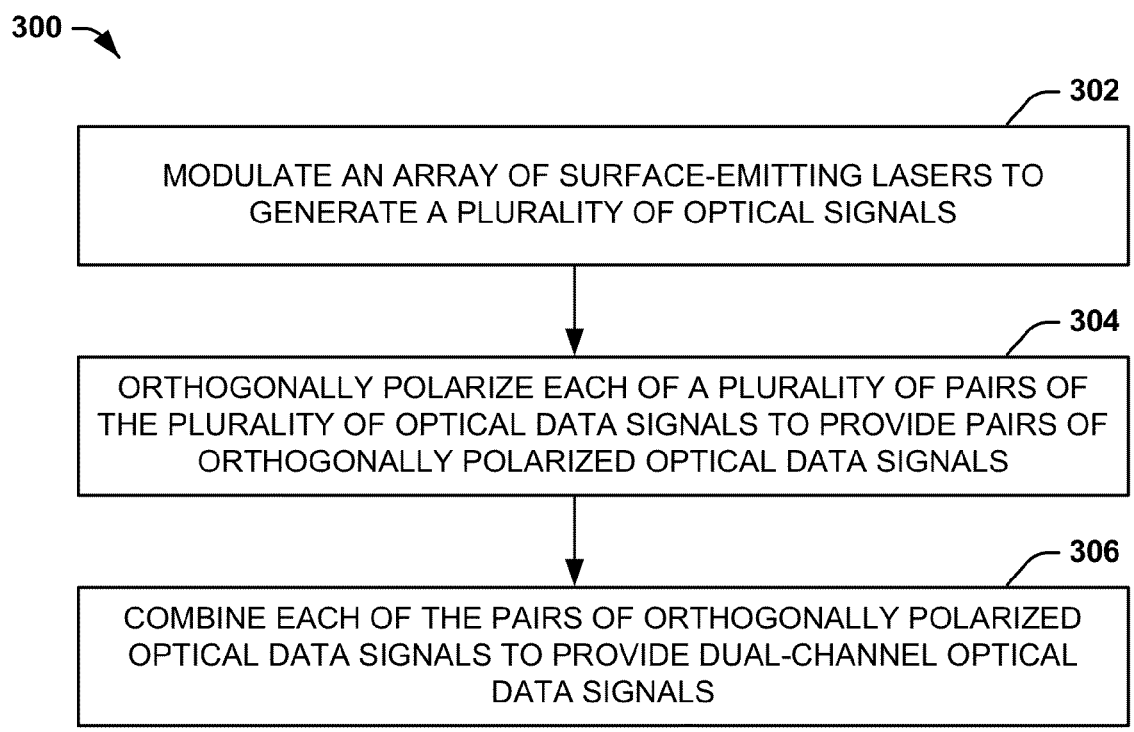
FIG. 7 is a flow diagram illustrating an example of a method for multiplexing optical signals.

In view of the foregoing structural and functional features described above, an example method will be better appreciated with reference to FIG. 7. While, for purposes of simplicity of explanation, the method of FIG. 7 is shown and described as executing serially, it is to be understood and appreciated that the method is not limited by the illustrated order, as some parts of the method could occur in different orders and/or concurrently from that shown and described herein.

FIG. 7 illustrates an example of a method 300 for multiplexing optical signals. At 302, an array of surface-emitting lasers (e.g., laser array 14 of FIG. 1) is modulated to generate a plurality of optical data signals. At 304, each of a plurality of pairs of the plurality of optical data signals are orthogonally polarized (e.g., as generated by lasers 16 and 18 of FIG. 1 or by one or more polarization rotating structures 110 of FIG. 3) to generate a plurality of pairs of orthogonally polarized optical data signals. At 306, each of the pairs of orthogonally polarized optical data signals are combined (e.g., by the optical polarization multiplexing system 20 of FIG. 1) to generate a plurality of dual-channel optical data signals.

What have been described above are examples. It is, of course, not possible to describe every conceivable combination of components or methodologies, but one of ordinary skill in the art will recognize that many further combinations and permutations are possible. Accordingly, the invention is intended to embrace all such alterations, modifications, and variations that fall within the scope of this application, including the appended claims. Additionally, where the disclosure or claims recite "a," "an," "a first," or "another" element, or the equivalent thereof, it should be interpreted to include one or more than one such element, neither requiring nor excluding two or more such elements.

What is claimed is:

1. An optical data system comprising:
an array of lasers that are modulated by a plurality of modulation signals to provide respective pairs of orthogonally polarized optical data signals; and
an optical multiplexing system to combine each of the respective pairs of orthogonally polarized optical data signals to provide a plurality of corresponding dual-channel optical data signals, the optical multiplexing system comprising:
a polarizing beam combiner to pass a first optical data signal of each of the pairs of orthogonally polarized optical data signals having a first polarization state and to reflect a second optical data signal of each of the pairs of orthogonally polarized optical data signals having a second polarization state which is orthogonal to the first polarization state; and
a solid optical medium comprising a first surface to which the polarizing beam combiner is coupled, the solid optical medium being oriented at an angel with respect to the respective pairs of orthogonally polarized optical data signals based on the refractive index of the solid optical medium, such that each signal of the respective pairs of orthogonally polarized optical data signals propagates through the solid optical medium at a refracted angle selected to combine each of the respective pairs of orthogonally polarized optical data signals at the polarizing beam combiner by reflecting the second optical data signal from a mirror coupled to a second surface of the solid optical medium spaced apart from and opposite the first surface and by reflecting the second optical data signal onto the polarizing beam combiner to combine respective pairs of orthogonally polarized optical data signals and provide the plurality of corresponding dual-channel optical data signals.

2. The system of claim 1, wherein the optical multiplexing system comprises a birefringent crystal to receive each of the pairs of orthogonally polarized optical data signals at a first surface and to combine each of the respective pairs of orthogonally polarized optical data signals by causing a first signal of each of the pairs of orthogonally polarized optical data signals to walk-off at the first surface and a second surface spaced apart from and opposite the first surface.

3. The system of claim 1, wherein the array of lasers comprises an array of vertical cavity surface-emitting lasers (VCSELs) having a common substrate, the array being one of a one-dimensional array or a two-dimensional array.

4. The system of claim 1, further comprising a polarization rotating structure to orthogonally polarize the first optical data signal of each of plurality of pairs of optical data signals emitted from the array of lasers to provide the respective pairs of orthogonally polarized optical data signals.

5. The system of claim 1, further comprising an optical demultiplexing system to receive the plurality of corresponding dual-channel optical data signals via respective optical transmission media that is connected between the optical multiplexing system and the optical demultiplexing system, wherein the optical demultiplexing system separates the plurality of corresponding dual-channel optical data signals into each of the pairs of orthogonally polarized optical data signals.

6. The system of claim 5, wherein the optical transmission media is a hollow metal waveguide to propagate the plurality of corresponding dual-channel optical data signals.

7. The optical data system of claim 1, wherein the array of lasers and the optical multiplexing system reside in an integrated package such that the optical multiplexing system receives the respective pairs of orthogonally polarized optical data signals directly.

8. The method of claim 1, wherein the array of surface-emitting lasers is one of a two-dimensional array and a plurality of one-dimensional arrays.

9. A method for multiplexing optical signals, the method comprising:
modulating an array of surface-emitting lasers to generate a plurality of pairs of polarized optical data signals having a first polarization state;
passing a first optical data signal of each of the pairs of polarized optical data signals through a polarizing beam combiner coupled to a first surface of a birefringent crystal;
passing a second optical data signal of each of the pairs of polarized optical data signals through a half-eave plate coupled to the first surface of the birefringent crystal to provide a second polarization state of the second optical data signal of each of the pairs of polarized optical data signals to provide the pairs of polarized optical data signals as pairs of orthogonally polarized optical data signals;
causing the first optical signal of the each of the pairs of orthogonally polarized optical data signals to walk-off at each of the first surface and a second surface of the birefringent crystal that is spaced apart from and opposite the first surface; and
reflecting the second optical data signal of each of the pairs of orthogonally polarized optical data signals from the second surface of the birefringent crystal and from the polarizing beam combiner, such that the first optical signal of the each of the pairs of orthogonally polarized optical data signals combines with the second optical signal of each of the pairs of orthogonally polarized optical data signals at the polarizing beam combiner to provide a plurality of corresponding dual-channel optical data signals.

10. The method of claim 9, wherein the birefringent crystal is oriented at an angle with respect to the plurality of pairs of polarized optical data signals.

11. The method of claim 10, wherein the angle is selected such that each signal of the respective pairs of orthogonally polarized optical data signals propagates through the solid optical medium at a refracted angle selected to combine each of the respective pairs of orthogonally polarized optical data signals to provide the plurality of corresponding dual-channel optical data signals.

12. The method of claim 9, further comprising propagating the plurality of dual-channel optical data signals via a hollow metal waveguide.

13. An integrated optical data transmission system comprising:
an array of surface-emitting lasers that are modulated by a plurality of modulation signals to provide a plurality of pairs of polarized optical data signals, wherein the array of surface-emitting lasers is one of a two-dimensional array or a two one-dimensional arrays having a common substrate;
an optical multiplexing system to combine each of the pairs of polarized optical data signals to provide the pair of polarized optical data signals as pairs of orthogonally polarized optical data signals, the optical multiplexing system comprising a solid optical medium that is oriented at an angle with respect to the plurality of pairs of polarized optical data signals, to reflect a second optical data signal from a mirror coupled to a first surface of the solid optical medium being spaced apart from and opposite a second surface of the solid optical medium at which the second optical data signal is combined with a first optical data signal, wherein the angel is selected such that each signal of the respective pairs of orthogonally polarized optical data signals propagates through the solid optical medium at a refracted angle selected to combine each of the respective pairs of orthogonally polarized optical data signals to provide a plurality of corresponding dual-channel optical data signals; and an optical demultiplexing system to receive the plurality of dual-channel optical data signals via respective hollow metal waveguides that are connected between the optical multiplexing system and the optical demultiplexing system.

14. The system of claim 13, wherein the mirror comprises a polarizing beam combiner to pass the first optical data signal of each of the pairs of polarized optical data signals having a first polarization state and to reflect the second optical data signal of each of the pairs of polarized optical data signals having a second polarization state that is orthogonal to the first polarization state such that the first optical data signal and the second optical data signal in each of the pairs of orthogonally polarized optical data signals are combined into the plurality of dual-channel optical data signals.

15. The system of claim 13, wherein the solid optical medium comprises a birefringent crystal to receive each of the pairs of polarized optical data signals in a parallel arrangement at the first surface and to combine each of the pairs of orthogonally polarized optical data signals by causing the first optical data signal of each of the pairs of orthogonally polarized optical data signals to walk-off at the first surface and at a second surface that is spaced apart from and opposite the first surface, such that each of the pairs of orthogonally polarized optical data signals are combined into the plurality of dual-channel optical data signals.

16. The system of claim 13, wherein the optical demultiplexing system separates the plurality of corresponding dual-channel optical data signals into each of the pairs of orthogonally polarized optical data signals.

* * * * *

UNITED STATES PATENT AND TRADEMARK OFFICE
CERTIFICATE OF CORRECTION

| | | |
|---|---|---|
| PATENT NO. | : 9,160,481 B2 | |
| APPLICATION NO. | : 13/877638 | |
| DATED | : October 13, 2015 | |
| INVENTOR(S) | : Wayne V. Sorin et al. | |

It is certified that error appears in the above-identified patent and that said Letters Patent is hereby corrected as shown below:

In the Claims

In column 9, line 20, in Claim 1, delete "angel" and insert -- angle --, therefor.

In column 10, line 4, in Claim 8, delete "method" and insert -- system --, therefor.

In column 10, line 17, in Claim 9, delete "half-eave" and insert -- half-wave --, therefor.

In column 10, line 61, in Claim 13, delete "pair" and insert -- pairs --, therefor.

In column 11, line 4, in Claim 13, delete "angel" and insert -- angle --, therefor.

Signed and Sealed this
Twenty-eighth Day of June, 2016

Michelle K. Lee
*Director of the United States Patent and Trademark Office*